(12) United States Patent
Bergmann et al.

(10) Patent No.: US 7,726,751 B2
(45) Date of Patent: Jun. 1, 2010

(54) COMMON STRUCTURE AND DOOR FOR MULTIPLE DOOR ELECTRICAL ENCLOSURE LATCHING SYSTEMS

(75) Inventors: Herberto Bergmann, São Paulo (BR); Jose Fernando Furtado, Cambridge (CA); Chester Malkowski, Jr., Franklin, WI (US); Arnaldo Hiroyuki Omoto, São Paulo (BR); José Batista Ferreira Neto, São Paulo (BR)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 811 days.

(21) Appl. No.: 11/271,003

(22) Filed: Nov. 11, 2005

(65) Prior Publication Data

US 2007/0108877 A1    May 17, 2007

(51) Int. Cl.
*E05C 7/06* (2006.01)
(52) U.S. Cl. ..................................................... 312/222
(58) Field of Classification Search ......... 312/215–222, 312/107–111; 292/260, 291, 301, 212, 206; 49/439
See application file for complete search history.

(56) References Cited

U.S. PATENT DOCUMENTS

| | | | | |
|---|---|---|---|---|
| 1,010,365 A | * | 11/1911 | Hensle | 292/302 |
| 2,195,223 A | * | 3/1940 | O'Connor | 292/19 |
| 2,656,948 A | * | 10/1953 | McGee | 220/3.8 |
| 3,240,862 A | * | 3/1966 | Merkl et al. | 174/371 |
| 4,570,467 A | * | 2/1986 | Greco | 70/99 |
| 4,829,887 A | * | 5/1989 | Holschbach | 454/56 |
| 5,567,027 A | * | 10/1996 | McClung et al. | 312/219 |
| 5,907,962 A | * | 6/1999 | Smithson et al. | 70/58 |
| 5,951,126 A | * | 9/1999 | Wolff et al. | 312/199 |
| 6,094,950 A | * | 8/2000 | Maynard et al. | 70/81 |
| 6,695,149 B1 | * | 2/2004 | Cote et al. | 211/26 |
| 7,264,321 B1 | * | 9/2007 | Bueley et al. | 312/265.5 |
| 2005/0218758 A1 | * | 10/2005 | Thackery et al. | 312/222 |
| 2006/0186678 A1 | * | 8/2006 | Myers et al. | 292/341.16 |
| 2008/0036344 A1 | * | 2/2008 | Johnson et al. | 312/324 |

\* cited by examiner

*Primary Examiner*—Janet M Wilkens
*Assistant Examiner*—Timothy M Ayres
(74) *Attorney, Agent, or Firm*—Fletcher Yoder LLP; Alexander R. Kuszewski; John M. Miller

(57) ABSTRACT

A multi-latch compatible system is disclosed for electrical enclosures. The system accommodates latches of different types and configurations. A rail structure may be formed to interface with pin-type latches and with plate-type latches. The rail structure may be configured as a pre-assembled insert that can be placed within an electrical enclosure. The system permits the same general structure to be used regardless of the type of latching mechanism selected and installed in the enclosure.

5 Claims, 6 Drawing Sheets

COMMON STRUCTURE AND DOOR FOR MULTIPLE DOOR ELECTRICAL ENCLOSURE LATCHING SYSTEMS

BACKGROUND

The present invention relates generally to the field of electrical enclosures. More particularly the invention relates to mechanisms for latching electrical enclosures in a closed position to house power electronic and other electrical circuit components within a controlled volume.

A wide range of applications exist for electrical enclosures of all types. Such enclosures are used heavily in industry, but also in mobile applications, offshore applications, consumer and commercial applications, and so forth. In general, electrical enclosures typically include a shell or box made of a heavy gage sheet metal. The enclosures are configured to support electrical circuitry and electrical components therein, and to receive and send electrical power and data signals. The internal components of the enclosure are accessible through doors, hatches and other openings. An important feature in such enclosures is that the doors can be readily opened, but closed and latched securely to prevent intrusion or tinkering with the components in an unauthorized manner.

A range of mechanical latch mechanisms have been developed for electrical enclosures. These often include various types of handles, some of which may be locked into position, or that may permit physical lock-out by means of a pad lock or other security device. One type of latching device makes use of a bayonet-type pin arrangement that offers advantages over more traditional latches. For example, such arrangements have been made that permit venting of gasses from the enclosure in the event of an electrical fault.

A drawback in the development of electrical enclosures has been the variety in the designs of the latching mechanisms. In general, the door, and particularly the internal structures of the enclosures may require completely different designs to accommodate the type of latch selected by a user. Little or no cross-over of these designs has taken place in the field. Accordingly, the entire enclosure assembly is most often selected from the outset, with little or no ability to adapt the enclosure for different latch types where desired. For manufacturers, then, such variety leads to additional costs in manufacturing, stocking and assembling different enclosure structures to accommodate the different latches.

There is a need, therefore, for a more universal system for latching electrical enclosures. There is, in particular, a need for a system that will accommodate various commercially available latch-types, and permit the use of these latch types in a cost-effective universal enclosure design.

BRIEF DESCRIPTION

The invention provides a novel electrical enclosure designed to respond to such needs. In general, the enclosure forms a shell that encloses an interior volume for housing electrical components. A door is hinged to the shell for closing the interior volume. A latch plate is configured to interface with a latching element of a first configuration that can be secured to the door to hold the door closed on the shell. A second latch plate is then configured to interface with a latching element of a second configuration that can be used with the door.

In a particular implementation disclosed below, one of the latch plates is designed to accommodate a latch pin-type latching element. An aperture is thus provided in the first latch plate to permit passage of the pin, which may then be latched by turning the pin in the door. In a present embodiment the second latch plate essentially comprises a rail behind which a latching element of the second configuration is disposed during latching. The latching element may be a plate-type rotatable component that is moved by a pin or handle.

The latching arrangement within the enclosure, comprising both latch plates may be configured as an insertable unit. That is, the plates may be part of an assembly that is securable within the enclosure shell, thereby permitting both types of latches to be accommodated in a simple and cost-effective manner.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
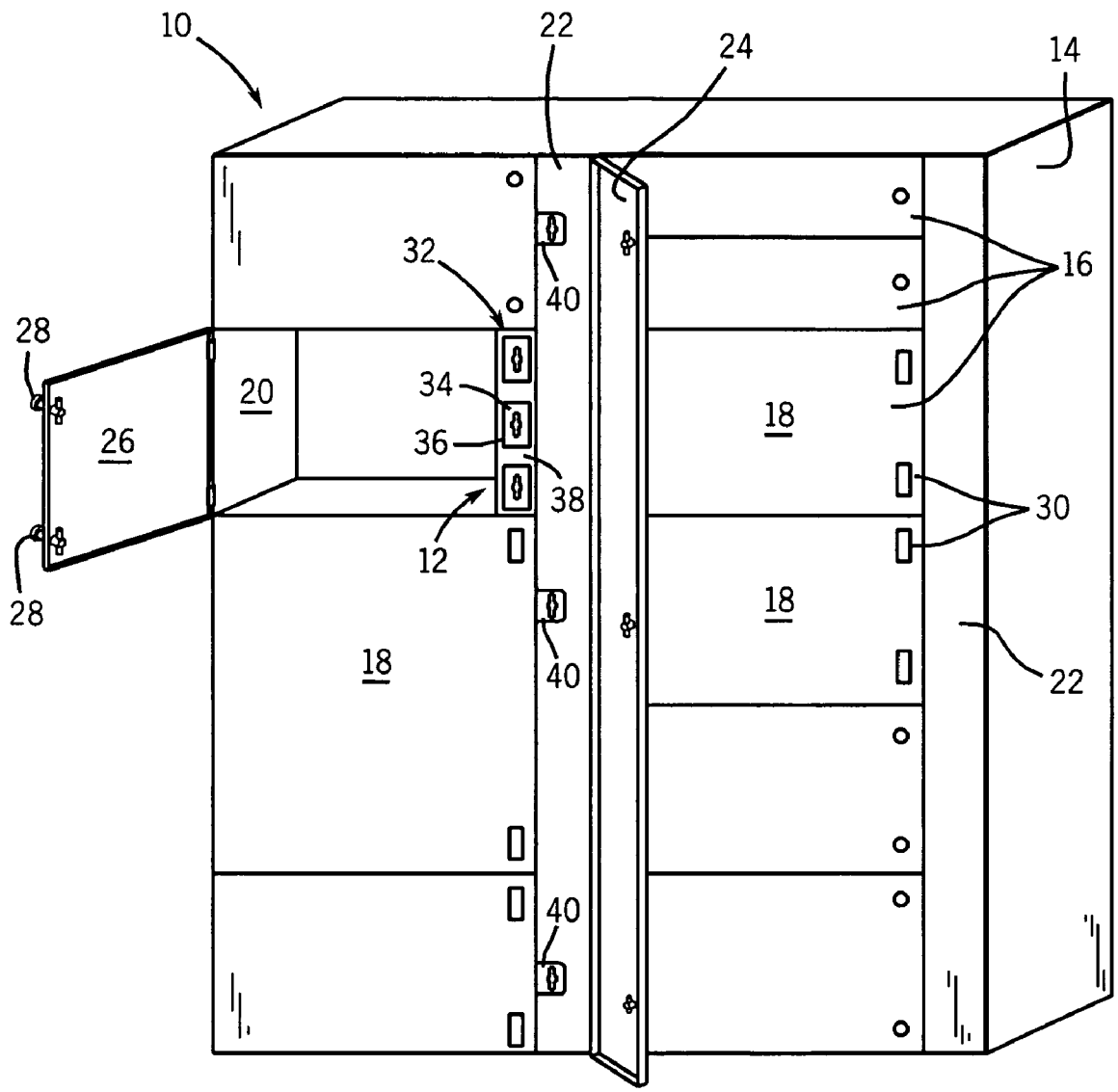
FIG. 1 is a perspective view of an exemplary electrical enclosure incorporating a latching system in accordance with aspects of the present invention.

Turning now to the drawings, and referring first to FIG. 1, an enclosure 10 is illustrated on which a multi-latch compatible system 12 is installed. The enclosure may be any suitable type and size. In the illustrated embodiment, for example, the enclosure may house an industrial motor control center. The enclosure generally includes a shell 14 which, in the illustrated embodiment, is divided into compartments 16, each having a corresponding door 18. The doors 18 may be opened and closed to gain access to an interior volume 20.

It should be noted that the present techniques are in no way limited, however, to any particular enclosure type or style. The invention will find application with enclosures made of conventional sheet metal, but may also be used with fiberglass enclosures, plastic enclosures, and so forth. The multi-latch compatible system described below may also be suitable for enclosures with a single door or with multiple doors and compartments. Similarly, the system may be used with enclosures designed to house both power electronic components, with or without data (e.g., computer) components, or with data components alone. Finally, the enclosure may be of a sealed type, or may be vented and unsealed, as desired.

In the embodiment illustrated, enclosure 10 further includes a wireway 22 over which a door 24 may be closed. As will be appreciated by those skilled in the art, electrical system components are typically disposed within the interior volume 20 of the compartments, while power and communication wiring may be routed through the wireway.

In the embodiment illustrated in FIG. 1, each door, such as open door 26, is provided with latches that interface with the multi-latch compatible system 12 to hold the doors closed. As described in greater detail below, door 26, for example, is provided with pin-type latches 28. Other doors may be provided with plate-type latches 30. Many such latches are known and are commercially available. In general, the present system permits multiple different types of latches to be provided on the doors, while all interfacing with the same multi-latch compatible system 12 installed in the enclosure shell.

As shown in FIG. 1, and as described in greater detail below, the system 12 generally includes a rail structure 32 that may be installed as an insert in the enclosure shell. The rail structure itself will include surfaces, apertures, and mechanical structures for receiving and interfacing with multiple different latch types. In the illustrated embodiment, for example, the rail structure has a rail 34 through which apertures are formed. Behind these apertures 36, the rail 34 has openings (described below) for receiving pin-type latches. A plate or rail 38 is also included in the rail structure for interfacing with plate-type latches. It may also be noted that in the illustrated embodiment, extensions 40 are provided on the rail structure (described in greater detail below) for accommodating latches for the wireway door 24. All of the latches may thus be accommodated by a single assembly fixed within the enclosure shell.

Figure 2:
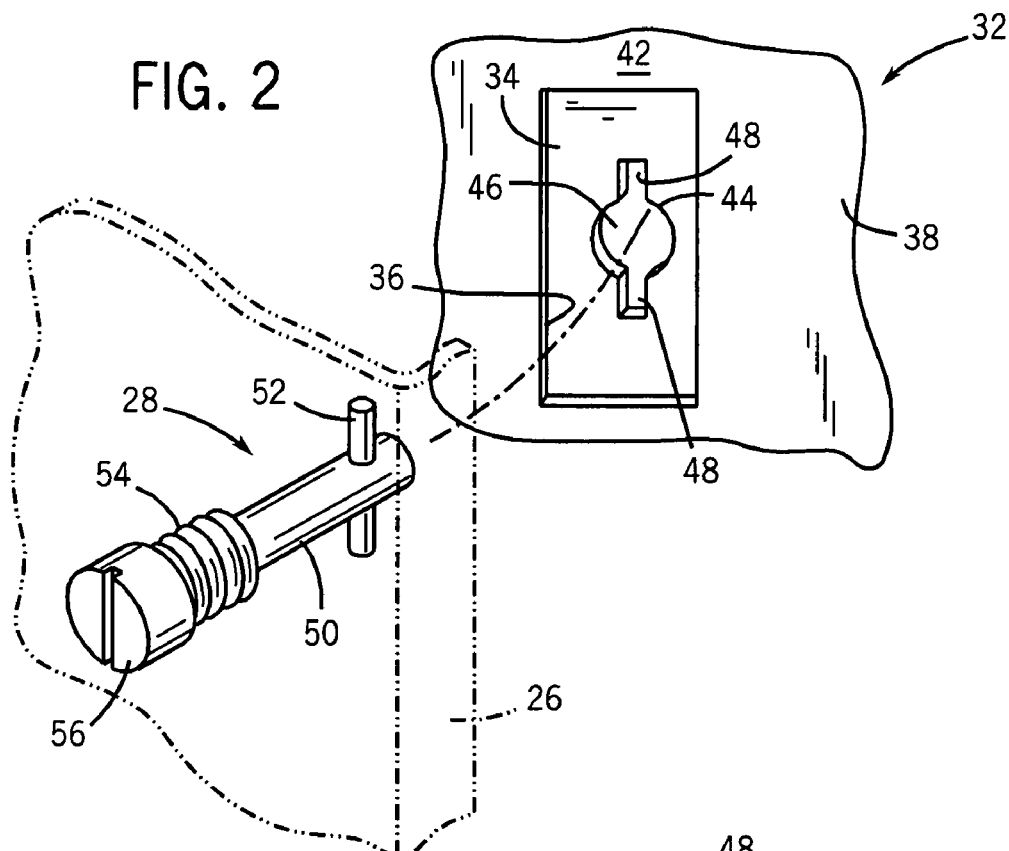
FIG. 2 is a detailed view of a portion of the system of FIG. 1 illustrating an exemplary manner in which a pin-type latching mechanism may be accommodated by a corresponding latch plate.

FIG. 2 illustrates an exemplary configuration of the system of FIG. 1 for accommodating a pin-type latching device. As shown in FIG. 2, the rail structure 32 of the system includes a front plate 42 through which apertures 36 are formed. Behind plate 42, and accessible through aperture 36, rail 34 presents an aperture 44 designed to receive the pin of a pin-type latch. In the illustrated embodiment, the aperture 44 has a central portion 46 flanked by elongated wings 48.

As will be appreciated by those skilled in the art and familiar with pin-type latches used in industry, an exemplary pin-type latch as shown in FIG. 2 has a central pin or shank 50 designed to be loaded in tension when the enclosure is closed. The pin in the illustrated embodiment receives a roll pin 52 near its extremity. The roll pin is loaded, when latched, in double shear against a rear surface of the rail 34. A spring 54 is disposed around the pin 50 between the outer surface of the enclosure door (as shown in dashed lines in FIG. 2) and a head 56 of the pin. To latch the door, then, the pin is rotated such that the roll pin 52 aligns with wings 48 of the aperture 44, and the spring is depressed to permit the roll pin to clear the rail 34. The pin is then rotated to block the roll pin 52 behind the rail 34. It should also be noted that the roll pin may be lodged within recesses formed in the rail to aid in retaining the roll pin in position behind the rail 34 against the force of spring 54. Also, a seal (not shown) may be provided on the pin at a point where the pin penetrates through the door of the enclosure.

Figure 3:
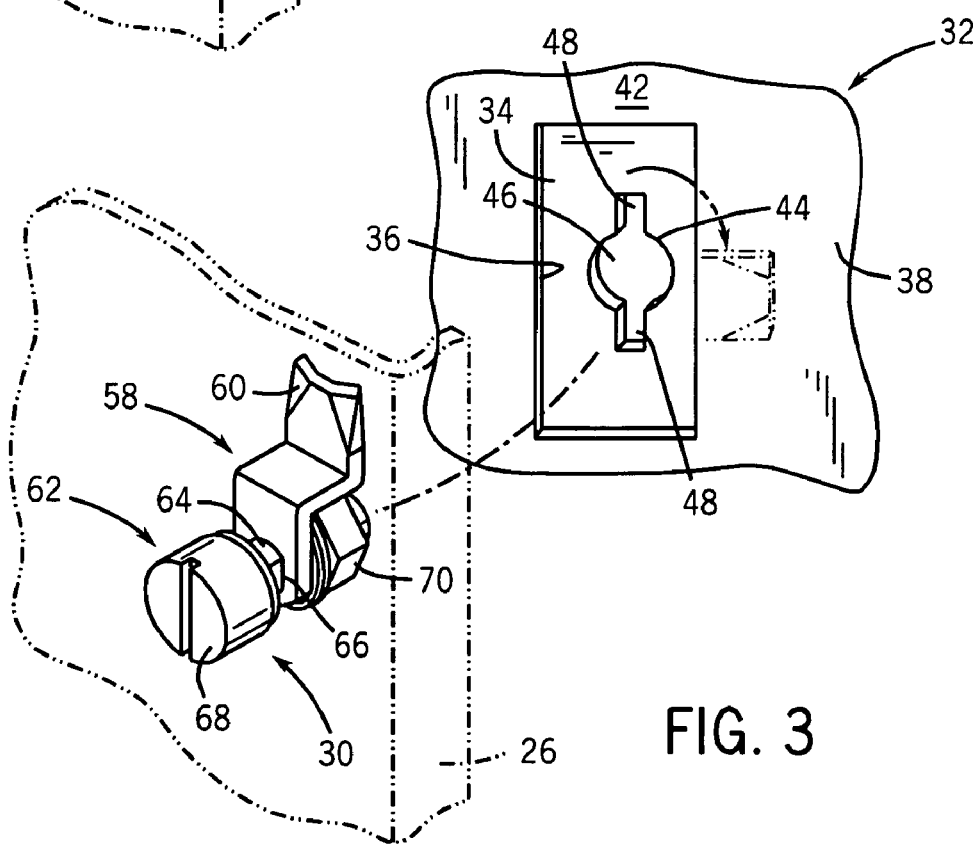
FIG. 3 is a similar detailed view of a portion of the system of FIG. 1 illustrating how a plate-type latch mechanism may be accommodated by a rail member of the system.

FIG. 3 shows the same system used with a plate-type latch mechanism. As shown in FIG. 3, the plate-type latch 30 includes a generally Z-shaped plate 58 that presents a tongue or extension 60 for latching the door. A pin or bolt 62 is secured to the latch plate and has a shank 64, one or more sides of which presents a flat 66. An aperture in the latch plate receives the shank of the pin, with the flat 66 mating with a corresponding flat in the latch plate. At an outer end, the pin has a head 68, and at an opposite end a threaded tip (no shown) on which a fastener 70 is secured. The latch plate will typically abut a shoulder (not specifically shown in FIG. 3) on the pin to securely hold the latch plate in position on the pin once the fastener is anchored onto the end of the pin. As in the previous arrangement, a seal may be provided on the pin at a point where the pin will traverse a door of the enclosure.

For closing the arrangement of FIG. 3, the tongue 60 of the latch plate will be positioned in a vertical orientation such that the latch plate will freely traverse the aperture 36 in front plate 42. Once the door is closed and the plate is past the rear surface of front plate 42, the pin may be rotated to secure the latch plate extension 60 behind the side plate 38 (as shown in dashed lines in FIG. 3).

Figure 4:
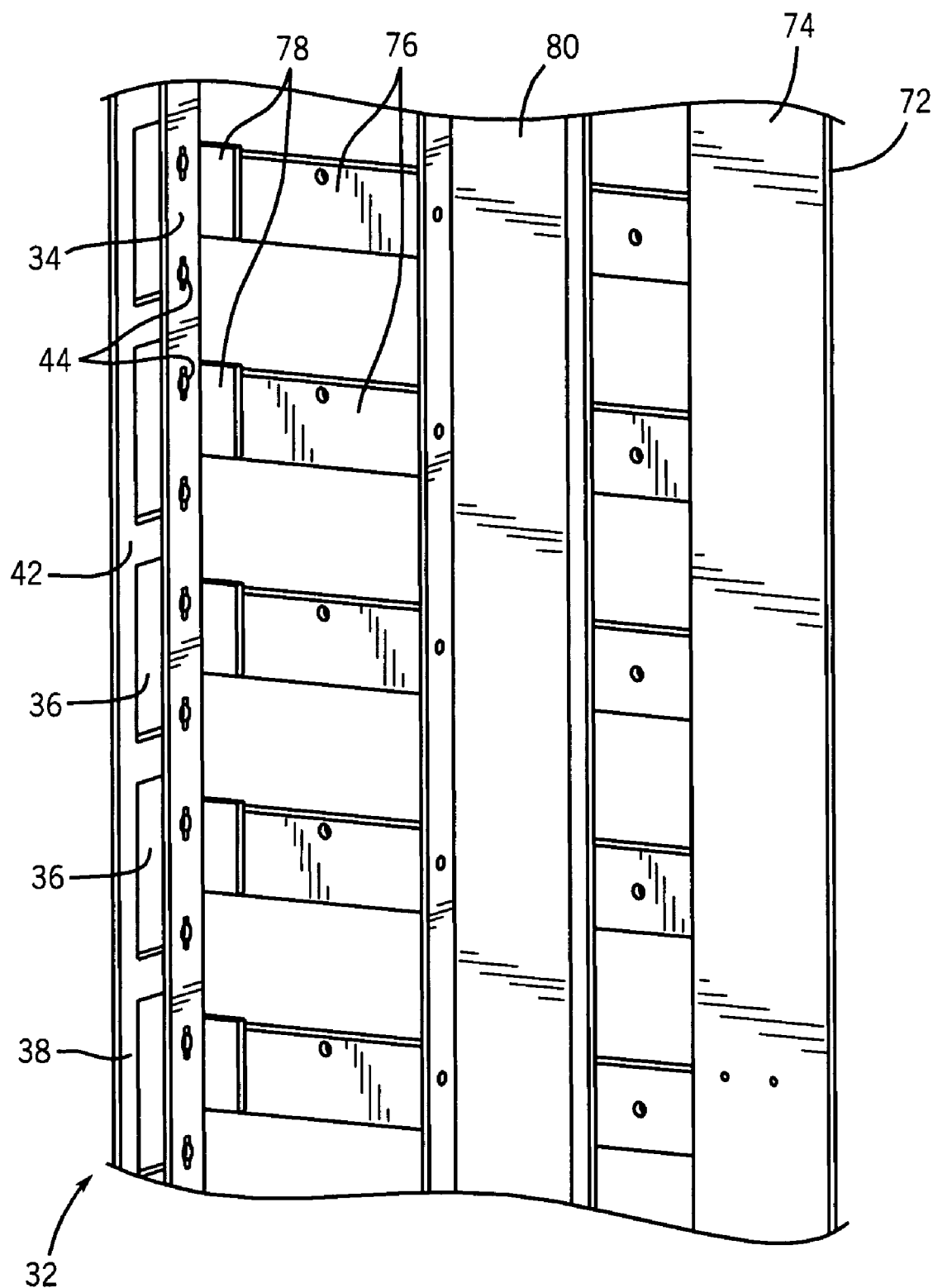
FIG. 4 is a partial elevational view of a latch plate assembly designed as an insert for an enclosure and incorporating a series of latch plates or latching surfaces of the type illustrated above.

FIG. 4 illustrates a portion of the multi-latch compatible system 12 embodied as an insert to be secured within the shell of an enclosure. As mentioned above, the insert generally forms a rail structure 32 that may span several compartments of a multi-compartment enclosure. The rail structure illustrated is formed of a main rail 72 which may be made of sheet metal that is stamped and bent to form the front plate 42. Apertures 36 are also punched or cut into the main rail prior to bending. The main rail thus presents a side panel 74 which may be provided with rungs 76 or similar structures that aid in supporting other components, shelves, and so forth (not shown), within the enclosure.

As illustrated in FIG. 4, the bent front plate 42 thus presents a series of apertures 36, seen from the rear in FIG. 4. The rail 34 designed to accommodate the pin-type latch mechanisms is, in the illustrated embodiment, added as a separate component. In the present embodiment this rail also is stamped from sheet metal and apertures 36 are cut at the time of formation of the rail. Tabs 78 are provided at locations of the rungs 76 of the main rail 72. These tabs permit the rail 34 to be welded to the main rail 72 during assembly, or attached by means of fasteners (e.g., screws, bolts or rivets). Various other rails and structures may be provided in the system. For example, in the illustrated embodiment, a stiffening member 80 is also welded to the side panel 74 of the mail rail 72. Such members may further facilitate securement of panels, shelves, and other structures (not shown) within the enclosure.

Figure 5:
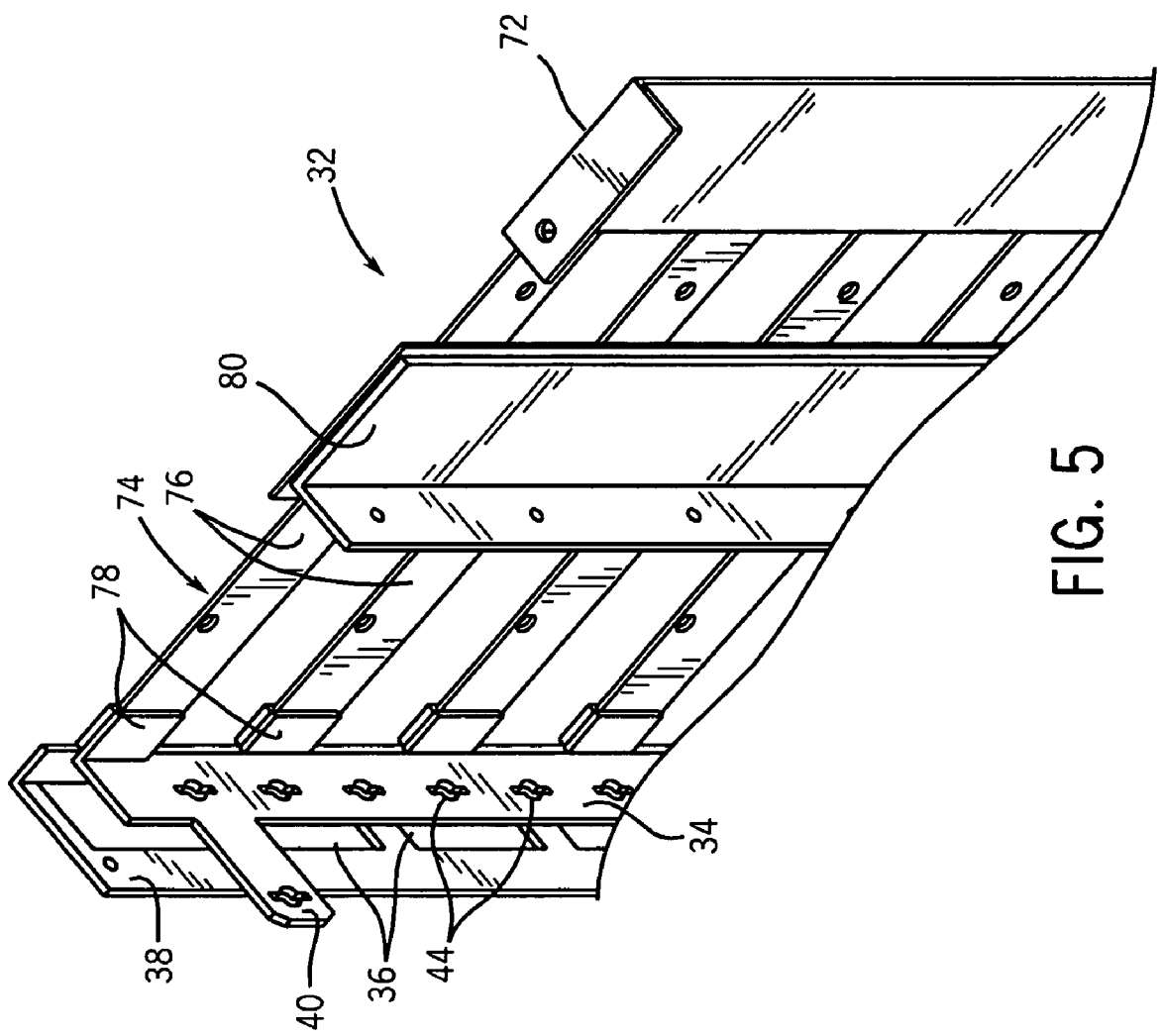
FIG. 5 is a top perspective view of a portion of the assembly of FIG. 4.
Figure 6:
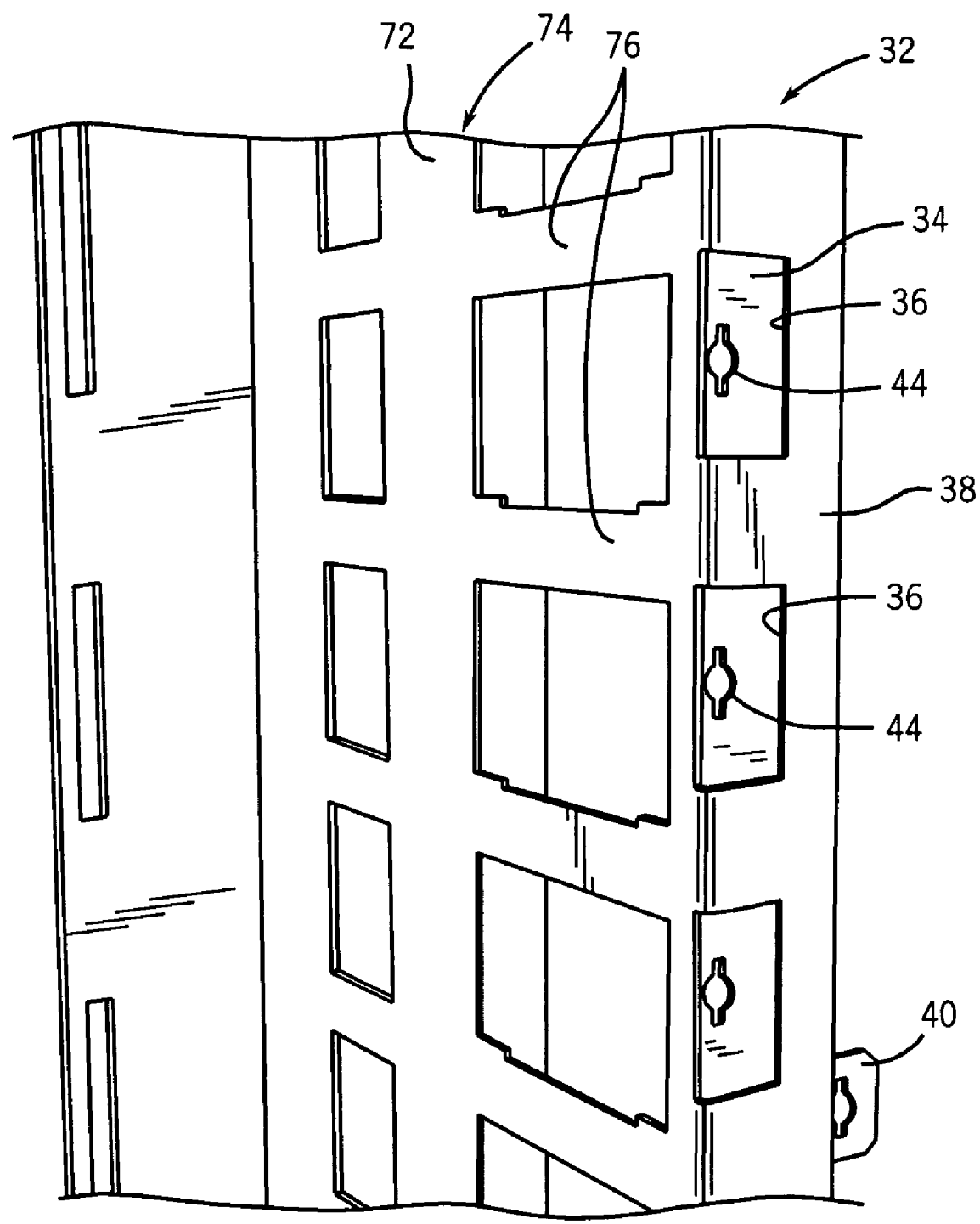
FIG. 6 is a partial front perspective view of the assembly of FIGS. 4 and 5.

FIGS. 5 and 6 are additional views of the rail structure both before and after installation in an enclosure. Both views illustrate the main rail 72 described above, with its side panel 74. The rungs 76 are again shown as they may be disposed within the enclosure for supporting internal components. The illustrated views of FIGS. 5 and 6 also show the extension 40 which is provided as part of rail 34, and may in the illustrated embodiment facilitate latching of a wireway door.

Figure 7:
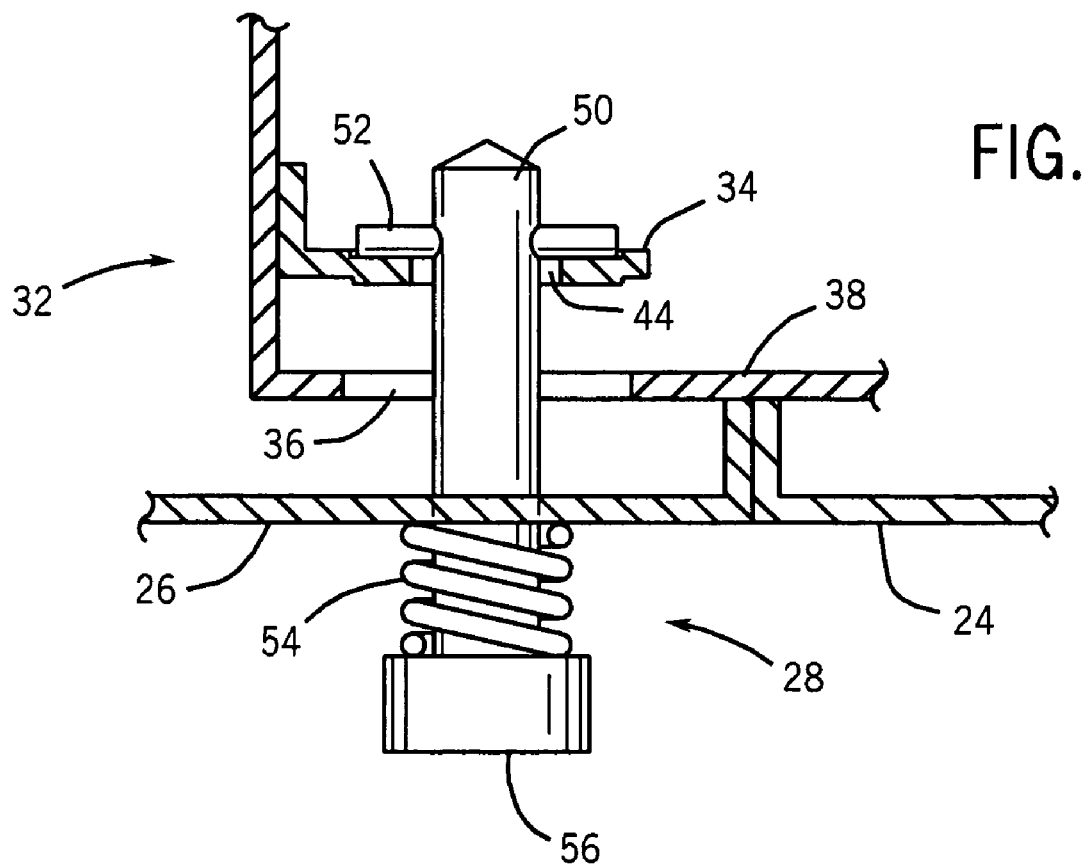
FIG. 7 is a partial sectional view looking downwardly on a door of an enclosure latched via the system illustrated in the previous figures by use of a pin-type latch.
Figure 8:
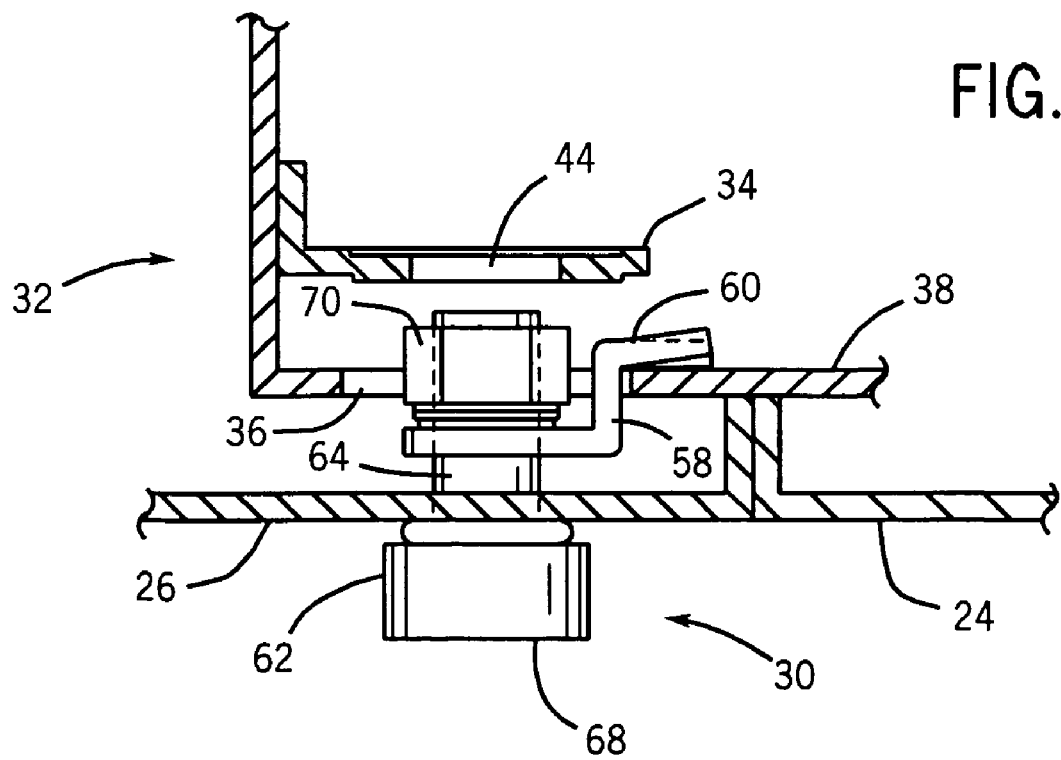
FIG. 8 is a view similar to that of FIG. 7 but illustrating the same enclosure closed via a plate-type latch mechanism.

FIGS. 7 and 8 illustrate the foregoing multi-latch compatible system in place for holding a door closed on an enclosure with both a pin-type latch mechanism and a plate-type mechanism, respectively. As shown in FIG. 7, once latched, the pin 50 of mechanism 28 extends through the aperture 44 in rail 34. The pin is illustrated as it would rotated to cause roll pin 52 to abut a rear surface of the rail 34. It should also be noted that both the pin and the accompanying roll pin may be freely inserted through aperture 36 in the plate 38. The biasing spring 54 then holds the pin in tension and the roll pin in double shear. A flange of the front door 26 abuts the front surface of plate 38 as shown. Where desired, a seal or gasket (not shown) may be provided, such as between the plate 38 and the flange of door 26.

As illustrated in FIG. 8, when a latch plate-type latch is employed, rail 34 generally does not come into play. Rather, the tongue 60 of the latch plate 58 is rotated behind the plate 38 of the rail structure and abuts the rear plate to hold the assembly tightly in engagement. Again, a flange of door 26 then abuts the front surface of plate 38, where a gasket may be provided, where desired. Seals, O-rings, or other compression members may also be provided between the head 68 of the latch pin 62 and a front surface of the door 36.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical enclosure comprising:
    a shell enclosing an interior volume for housing electrical components;
    a plurality of doors hinged to the shell for closing the interior volume;
    at least one first latch plate coupled to the shell, and including a first plurality of openings configured to receive latch pins for latches of the doors in locations generally aligned with the first plurality of openings when latches of a first configuration are mounted to the doors; and
    at least one second latch plate different from the first latch plate and having a second plurality of openings different from the first plurality of openings and generally aligned with the first plurality of openings and also coupled to the shell, and configured to bear against a rotary extension of latches of the doors in locations generally aligned with the second plurality of openings when latches of a second configuration different from the first configuration are mounted to the doors in the same location as the first latches and in place of the first latches.

2. The enclosure of claim 1, wherein the first plurality of openings include a central aperture and wings for receiving lateral extensions of the latch pins.

3. The enclosure of claim 1, wherein the at least one first latch plate includes an elongated rail in which multiple openings are formed to receive the latch pins, and at least one additional latch plate having a similar opening for a wireway door latch pin.

4. The enclosure of claim 1, wherein the at least one second latch plate includes an elongated rail having a rear face configured to bear against the rotary extension of the latch of the second configuration.

5. The enclosure of claim 1, wherein the at least one first and the at least one second latch plates are both part of an insert configured to be fixed within the enclosure shell.

\* \* \* \* \*